United States Patent
Zhang et al.

(10) Patent No.: US 9,933,642 B2
(45) Date of Patent: Apr. 3, 2018

(54) BACKPLATE FOR A REAR SURFACE OF A DISPLAY

(71) Applicant: Shenzhen China Star Optoelectronics Technology Co., Ltd., Shenzhen, Guangdong (CN)

(72) Inventors: Zuwei Zhang, Guangdong (CN); Guofu Tang, Guangdong (CN); Jiani Feng, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 79 days.

(21) Appl. No.: 14/909,826

(22) PCT Filed: Dec. 25, 2015

(86) PCT No.: PCT/CN2015/098864
§ 371 (c)(1),
(2) Date: Feb. 3, 2016

(87) PCT Pub. No.: WO2017/059635
PCT Pub. Date: Apr. 13, 2017

(65) Prior Publication Data
US 2017/0261777 A1   Sep. 14, 2017

(30) Foreign Application Priority Data
Oct. 8, 2015 (CN) .......................... 2015 1 0646687

(51) Int. Cl.
*A47G 29/00* (2006.01)
*G02F 1/1333* (2006.01)

(52) U.S. Cl.
CPC .................. *G02F 1/1333* (2013.01)

(58) Field of Classification Search
CPC ...................................... G02F 1/1333
USPC ............................. 248/903, 917, 918, 694;
361/679.22–679.25
See application file for complete search history.

(56) References Cited

U.S. PATENT DOCUMENTS

2008/0232058 A1* 9/2008 Horiuchi ............... G06F 1/1616
361/679.55
2010/0321870 A1* 12/2010 Hirai ..................... G06F 1/1656
361/679.01

FOREIGN PATENT DOCUMENTS

CN  102798095 A   11/2012
JP  2008066884 A   3/2008

\* cited by examiner

*Primary Examiner* — Gwendolyn W Baxter
(74) *Attorney, Agent, or Firm* — Andrew C. Cheng

(57) ABSTRACT

A backplate for a rear surface of a display comprises a backplate main body and a stiffener assembly disposed on the surface of the backplate main body, the stiffener assembly comprises a first inclined rib extending from each corner of the backplate main body toward the center and a second inclined rib surrounding triangle areas with every corners; wherein, the first inclined rib sets up a cross relative to the nearest second inclined rib. The surface of the backplate main body comprises a stiffener assembly with a plurality of stiffener ribs, a first inclined rib extending from each corner toward the center, and a second inclined rib disposed at every corners.

17 Claims, 2 Drawing Sheets

BACKPLATE FOR A REAR SURFACE OF A DISPLAY

BACKGROUND OF THE INVENTION

1. Field of the Invention

The invention relates to display technology field, in particular to a backplate.

2. The Related Arts

To comply with develop of economic society and display technology, the requirement of size of flat-panel television is larger than before for people. The larger corresponding liquid crystal module, the more complicated whole equipment process is. Extra cost is even needed to solve some reliability problems. After forming, a large size of backplate will be deformed, even unstable curvature if the backplate is curved surface.

As shown in FIG. 1a and FIG. 1b, the traditional approach is adding crisscrossed stiffeners 1a (as shown in FIG. 1) or extra braces (as shown in FIG. 2) on the surface of backplate 1 to ensure the strength and -stiffness of whole backplate; however, the problem that whole backplate is deformed, especially in corners could not be solved very well.

SUMMARY

In view of the disadvantages in the conventional art, a backplate with deformation, reliable structures and low cost is provided in the present disclosure.

In order to achieve the aforementioned objects, the present disclosure provides the technical solutions as following:

A backplate comprises a backplate main body and a stiffener assembly disposed on the surface of the backplate main body, the stiffener assembly comprises a first inclined rib extending from each corner of the backplate main body toward the center and a second inclined rib surrounding triangle areas with every corners; wherein, the first inclined rib sets up a cross relative to the nearest second inclined rib.

Further, the extending terminal point of the first inclined rib is located on the second inclined rib.

Further, the first inclined rib is perpendicular to the second inclined rib.

Further, the first inclined rib is collinear with the angular bisector of a corner on which located the first inclined rib.

Further, an end of the second inclined rib is located at the middle point of the short side of the backplate main body.

Further, another end of the second inclined rib is located at the one-third point of the long side of the backplate main body.

Further, the stiffener assembly further comprises four third inclined ribs, and the third inclined ribs form a closed quadrilateral located at the center of the backplate main body.

Further, the angular bisectors of the quadrilateral match together with the two symmetry axes of the backplate main body.

Further, the quadrilateral is a square.

Further, the stiffener assembly further comprises at least one fourth inclined rib, and the fourth inclined rib is a diagonal connected between the two opposing corners of the square.

The surface of the backplate main body of the present disclosure comprises a stiffener assembly with a plurality of stiffener ribs, a first inclined rib extending from each corner toward the center, and a second inclined rib disposed at every corners. Triangle areas are surrounded by the second inclined rib and corners corresponding to the second inclined rib, and the first inclined rib sets up a cross relative to the nearest second inclined rib to increase deformation ability, strengthening force, structural reliability and low cost.

DETAILED DESCRIPTION OF THE PREFERRED EMBODIMENTS

In order to make the objects, technical solution and advantages of the present disclosure will become apparent from the accompanying drawings and the following embodiments, the present disclosure will be described in further detail. It should be understood that the specific embodiment described herein are only for explaining the present disclosure and are not intended to limit the present disclosure.

Figure 1A:
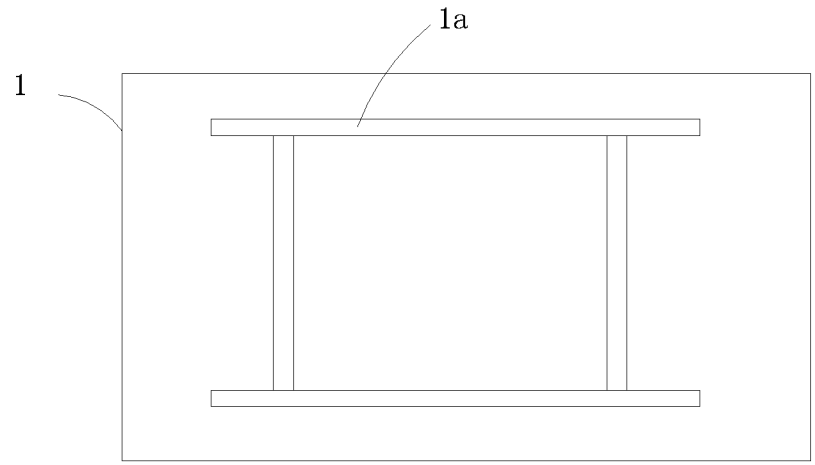
FIG. 1a is a structural schematic diagram showing a backplate of the previous disclosure.
Figure 1B:
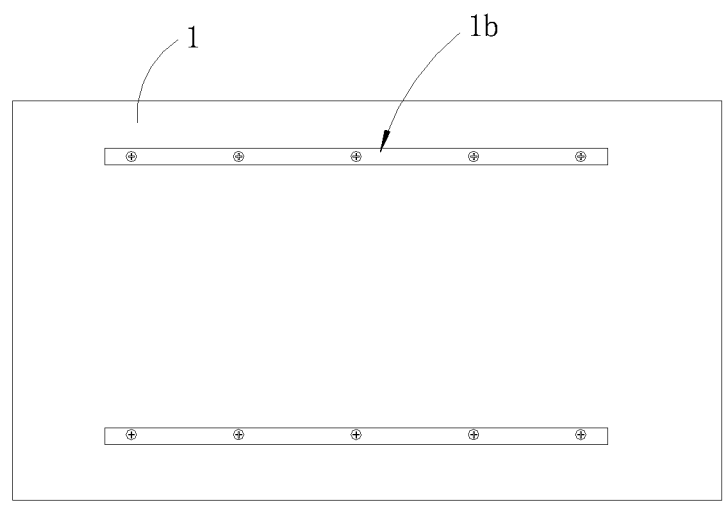
FIG. 1b is a structural schematic diagram showing another backplate of the previous disclosure.
Figure 2:
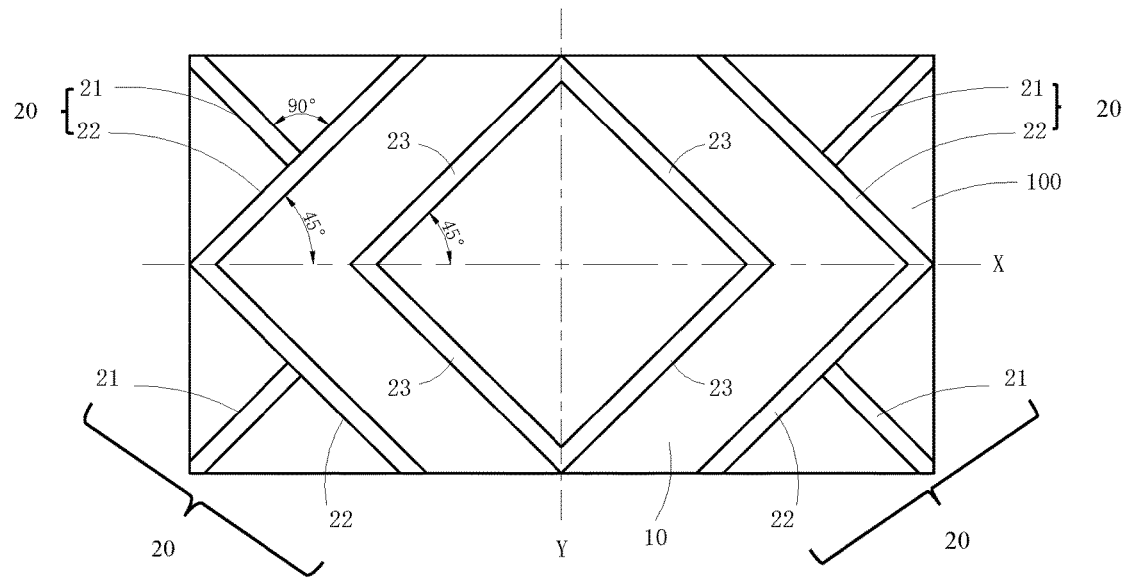
FIG. 2 is a structural schematic diagram showing a backplate of an embodiment in the disclosure.

The backplate of the disclosure can be utilized in varies kinds of display devices. Please refer to FIG. 2, the backplate of the disclosure comprises a backplate main body 10 and a stiffener assembly 20 disposed on the surface of the backplate main body 10; the stiffener assembly 20 comprises a first inclined rib 21 extending from each corner of the backplate main body 10 toward the center and a second inclined rib 22 surrounding triangle areas with every corner; wherein, the first inclined rib 21 sets up a cross relative to the nearest second inclined rib.

Every corner can be strengthened to increase strengthening forces at deformation portions of the backplate, both flat backplate and curved backplate, by this technology in the disclosure.

The backplate main body 10 is a standard curved board or rectangular board with long sides of length direction and short sides of width directions, horizontal symmetry axis X and vertical symmetry axis Y of backplate main body 10 are symmetrical, and the two symmetry axes divide the backplate main body 10 into four small subareas; wherein, horizontal symmetry axis X and vertical symmetry axis Y of stiffener assembly 20 are symmetrical, in other words, two symmetry axes of four first inclined ribs 21 and four second inclined ribs 22 related to the backplate main body 10 are both symmetrical. Therefore, whole backplate main body 10 can be ensured to have symmetrical standard force, and curvature stability of backplate can be ensured even inside curved backplate.

Further, the extending terminal point of the first inclined rib 21 is located on the second inclined rib 22 to save unnecessary extending lengths; the first inclined rib 21 is perpendicular to the second inclined rib 22 and intersects in the midpoint with the second inclined rib 22; every first inclined rib 21 is collinear with the angular bisector of a corner on which located the first inclined rib 21, in the other words, the included angles between the second inclined rib 22 and both long sides and short sides of backplate main body 10 are all 45°. Furthermore, an end of the second inclined rib 22 is located at the middle point of the short side of the backplate main body 10, and another end of the second inclined rib 22 is located at the one-third point of the long side of the backplate main body 10.

Meanwhile, the stiffener assembly 20 further comprises four third inclined ribs 23, and the third inclined ribs 23 form a closed quadrilateral located at the center of the backplate main body 10 to further confirm no deformation situation occurred in the whole backplate, and further strengthen strength and stuffiness of backplate. Here, the angular bisectors of the quadrilateral match together with the two symmetry axes of the backplate main body 10. Furthermore, the third inclined ribs 23 are parallel to the second inclined ribs 22 on the same subarea to obtain a quadrilateral as a square, and two corners of the square are located at midpoints of long sides of the backplate main body 10. It is known that inclined angles of inclined ribs can be adjusted if necessary.

Figure 3:
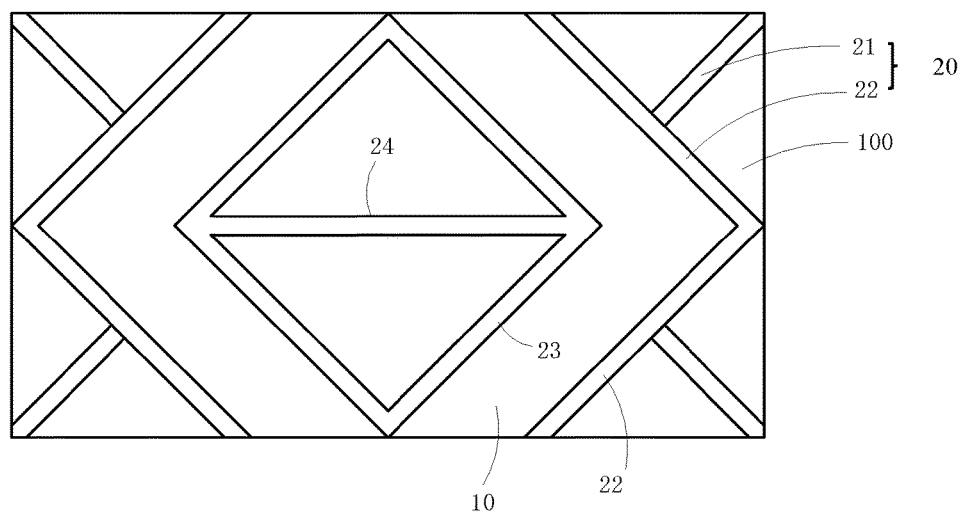
FIG. 3 is a structural schematic diagram showing a backplate of another embodiment in the disclosure.

As shown in FIG. 3, FIG. 3 is another backplate structure of an embodiment in the present disclosure, wherein, the stiffener assembly 20 further comprises at least one fourth inclined rib 24, and the fourth inclined rib 24 is parallel to the long sides and connected between the two opposing corners of the square to further enhance curvature of backplate for reducing structure of external frame support in conditional curve backplate, decreasing component costs, saving researching and developing cost in molding in external frame support, and then increasing compatibilities of whole product.

The above description is only the specific embodiment of the present application, it should be noted that those of ordinary skill in the art, in this disclosure without departing from the principles of the premise, but also a number of improvements modifications can be made, these improvements and modifications are to be considered the scope of the present disclosure.

What is claimed is:

1. A backplate for attaching to a rear surface of a display, comprises a backplate main body and a stiffener assembly disposed on the surface of the backplate main body, the stiffener assembly comprises a first inclined rib extending from each corner of the backplate main body toward the center and a second inclined rib surrounding triangle areas with every corner; wherein the first inclined rib sets up a cross relative to the nearest second inclined rib and an end of the second inclined rib is located at the middle point of the short side of the backplate main body and wherein the back plate is attachable on the rear surface of the display.

2. The backplate according to claim 1, wherein the extending terminal point of the first inclined rib is located on the second inclined rib.

3. The backplate according to claim 2, wherein another end of the second inclined rib is located at the one-third point of the long side of the backplate main body.

4. The backplate of claim 2, wherein the stiffener assembly further comprises four third inclined ribs, and the third inclined ribs form a closed quadrilateral located at the center of the backplate main body.

5. The backplate according to claim 4, wherein the angular bisectors of the quadrilateral match together with the two symmetry axes of the backplate main body.

6. The backplate according to claim 5, wherein the quadrilateral is a square.

7. The backplate according to claim 5, wherein the stiffener assembly further comprises at least one fourth inclined rib, and the fourth inclined rib is a diagonal connected between the two opposing corners of the square.

8. The backplate according to claim 1, wherein the first inclined rib is perpendicular to the second inclined rib.

9. The backplate according to claim 8, wherein, the first inclined rib is collinear with the angular bisector of a corner on which located the first inclined rib.

10. The backplate according to claim 9, wherein another end of the second inclined rib is located at the one-third point of the long side of the backplate main body.

11. The backplate of claim 9, wherein the stiffener assembly further comprises four third inclined ribs, and the four third inclined ribs form a closed quadrilateral located at the center of the backplate main body.

12. The backplate according to claim 11, wherein, the angular bisectors of the quadrilateral match together with the two symmetry axes of the backplate main body.

13. The backplate according to claim 1, wherein another end of the second inclined rib is located at the one-third point of the long side of the backplate main body.

14. The backplate of claim 1, wherein the stiffener assembly further comprises four third inclined ribs, and the third inclined ribs form a closed quadrilateral located at the center of the backplate main body.

15. The backplate according to claim 14, wherein the angular bisectors of the quadrilateral match together with the two symmetry axes of the backplate main body.

16. The backplate according to claim 15, wherein the quadrilateral is a square.

17. The backplate according to claim 15, wherein the stiffener assembly further comprises at least one fourth inclined rib, and the fourth inclined rib is a diagonal connected between the two opposing corners of the square.

* * * * *